United States Patent
Hasek

(10) Patent No.: US 10,142,594 B2
(45) Date of Patent: Nov. 27, 2018

(54) SYSTEM AND METHOD FOR TAILORED VIDEO-ON-DEMAND CATALOGS

(75) Inventor: Charles Hasek, Broomfield, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 1718 days.

(21) Appl. No.: 12/200,322

(22) Filed: Aug. 28, 2008

(65) Prior Publication Data

US 2010/0058402 A1   Mar. 4, 2010

(51) Int. Cl.
  *H04N 7/173* (2011.01)
  *H04N 21/258* (2011.01)
  *H04N 21/262* (2011.01)
  *H04N 21/81* (2011.01)

(52) U.S. Cl.
  CPC ... *H04N 7/17318* (2013.01); *H04N 21/25883* (2013.01); *H04N 21/25891* (2013.01); *H04N 21/26283* (2013.01); *H04N 21/812* (2013.01)

(58) Field of Classification Search
  CPC ............. H04N 5/44543; H04N 21/482; H04N 21/4753; H04N 21/84; H04N 21/4755; H04N 21/4782
  See application file for complete search history.

(56) References Cited

U.S. PATENT DOCUMENTS

| | | | |
|---|---|---|---|
| 6,388,714 B1 * | 5/2002 | Schein et al. | 348/563 |
| 7,370,342 B2 * | 5/2008 | Ismail et al. | 725/46 |
| 7,594,247 B2 * | 9/2009 | Arai et al. | 725/54 |
| 2003/0056217 A1 | 3/2003 | Brooks | |
| 2003/0093790 A1 | 5/2003 | Logan et al. | |
| 2004/0117831 A1 * | 6/2004 | Ellis | H04N 5/44543 725/53 |
| 2005/0060745 A1 | 3/2005 | Riedl et al. | |
| 2005/0096978 A1 | 3/2005 | Black | |
| 2005/0240961 A1 * | 10/2005 | Jerding | H04N 5/44543 725/37 |
| 2005/0251827 A1 * | 11/2005 | Ellis | H04N 5/44543 725/47 |

(Continued)

*Primary Examiner* — Fred Peng
(74) *Attorney, Agent, or Firm* — Otterstedt, Ellenbogen & Kammer, LLP

(57) ABSTRACT

A video-on-demand server, having a plurality of audiovisual assets stored in association therewith, and an application server module, are interconnected with a first group of consumer premises equipment associated with a first group of subscribers and a second group of consumer premises equipment associated with a second group of subscribers, different than the first group of subscribers, via a video content network. The application server module, the first group of consumer premises equipment, and the second group of consumer premises equipment are cooperatively configured to prepare a first video-on-demand catalog comprising a first group of the audiovisual assets and a second video-on-demand catalog comprising a second group of the audiovisual assets, different than the first group of the audiovisual assets. The application server module, the first group of consumer premises equipment, and the second group of consumer premises equipment are further cooperatively configured to make the first video-on-demand catalog available to the first group of subscribers and to make the second video-on-demand catalog available to the second group of subscribers.

25 Claims, 5 Drawing Sheets

(56) References Cited

U.S. PATENT DOCUMENTS

| | | | |
|---|---|---|---|
| 2006/0236342 A1* | 10/2006 | Kunkel | H04N 5/44543 725/52 |
| 2007/0044133 A1* | 2/2007 | Hodecker | 725/117 |
| 2007/0061840 A1* | 3/2007 | Walter et al. | 725/39 |
| 2008/0066103 A1* | 3/2008 | Ellis | H04N 5/44591 725/38 |
| 2008/0092168 A1 | 4/2008 | Logan et al. | |
| 2008/0193104 A1 | 8/2008 | Hasek | |
| 2008/0253406 A1 | 10/2008 | Hasek | |
| 2009/0320077 A1* | 12/2009 | Gazdzinski | 725/62 |
| 2010/0205644 A1* | 8/2010 | Lin et al. | 725/114 |
| 2012/0102523 A1* | 4/2012 | Herz | G06Q 20/383 725/34 |

* cited by examiner

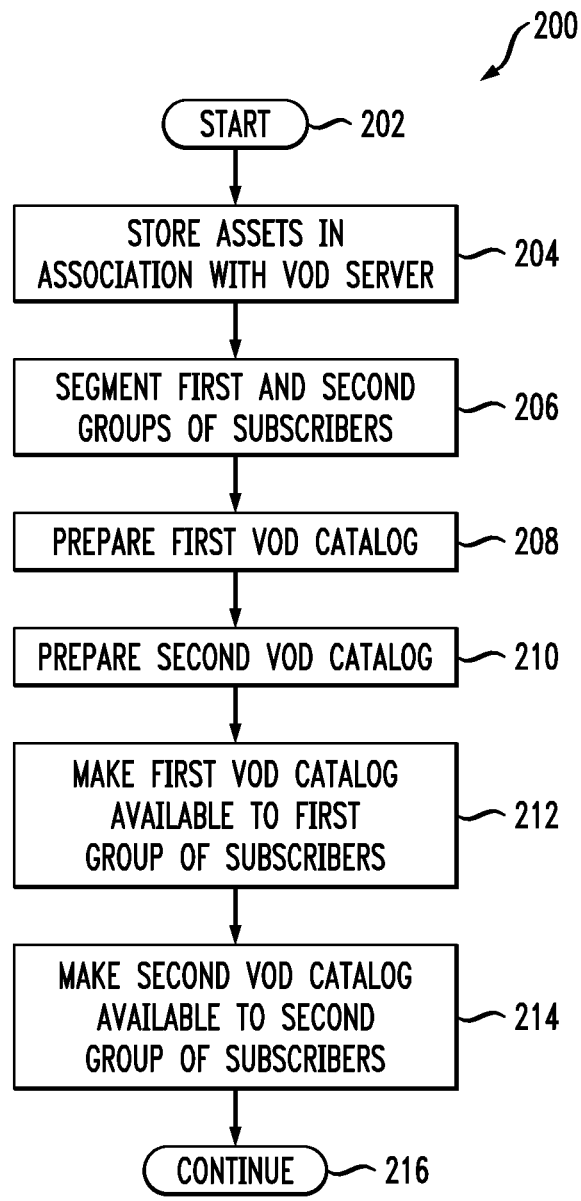

| | ASSET | GROUP 1 CATALOG | GROUP 2 CATALOG |
|---|---|---|---|
| 308 | MOVIE 1 - ENGLISH | X | |
| 310 | CLASSIC HOCKEY GAME 1 | X | X |
| 312 | MOVIE 2 - RUSSIAN | | X |
| 314 | MOVIE 3 - ENGLISH | X | |
| 316 | CLASSIC BASEBALL GAME 1 | X | |

SYSTEM AND METHOD FOR TAILORED VIDEO-ON-DEMAND CATALOGS

FIELD OF THE INVENTION

The present invention relates generally to communications systems and methods, and, more particularly, to video content networks and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level.

SUMMARY OF THE INVENTION

Principles of the present invention provide techniques for tailored video-on-demand catalogs. In one aspect, an exemplary video content system includes a video-on-demand server having a plurality of audiovisual assets stored in association therewith; an application server module; a first group of consumer premises equipment associated with a first group of subscribers; and a second group of consumer premises equipment associated with a second group of subscribers, different than the first group of subscribers. A video content network interconnects the video-on-demand server and the application server module to the first and second groups of consumer premises equipment. One or more of the application server module, the first group of consumer premises equipment, and/or the second group of consumer premises equipment are configured to prepare a first video-on-demand catalog comprising a first group of the audiovisual assets, and prepare a second video-on-demand catalog comprising a second group of the audiovisual assets. The second group of the audiovisual assets is different than the first group of the audiovisual assets. One or more of the application server module, the first group of consumer premises equipment, and/or the second group of consumer premises equipment are further configured to make the first video-on-demand catalog available to the first group of subscribers; and make the second video-on-demand catalog available to the second group of subscribers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

In another aspect, an exemplary method (which can be computer-implemented) includes the steps of storing a plurality of audiovisual assets in association with a video on demand server; preparing a first video-on-demand catalog comprising a first group selected from the audiovisual assets; and preparing a second video-on-demand catalog including a second group selected from the audiovisual assets, the second group being different than the first group. Additional steps include making the first video-on-demand catalog available to a first group of subscribers; and making the second video-on-demand catalog available to a second group of subscribers, different than the first group of subscribers.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in one or more servers or modules described herein, consumer premises equipment such as a digital set-top terminal, and the like. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments provide a regionalized VOD service, which reduces memory and/or bandwidth requirements, inasmuch as a complete VOD catalog need not be sent to each and every customer. Accordingly, in one or more embodiments, less cache memory would be needed in the set-top box, and less bandwidth would be needed to send the VOD catalog.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow chart of exemplary method steps, according to an aspect of the invention;

DETAILED DESCRIPTION OF PREFERRED EMBODIMENTS

Figure 1:
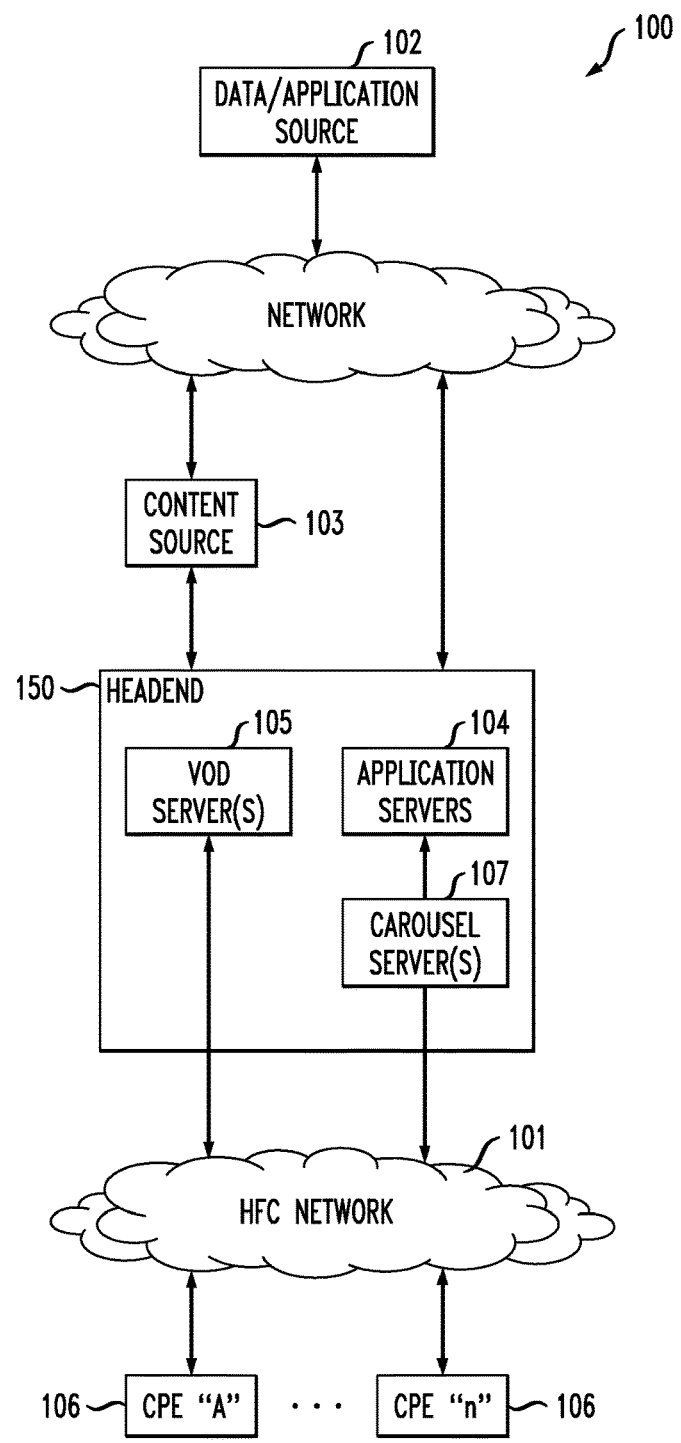
FIG. 1 is a functional block diagram illustrating an exemplary hybrid fiber-coaxial (HFC) network configuration useful with one or more embodiments of the present invention.

FIG. 1 illustrates a typical content-based network configuration with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer or customer's premises equipment (CPE) 106. The distribution server(s) 104, VOD servers 105 and CPE(s) 106 are connected via a bearer (e.g., hybrid fiber cable (HFC)) network 101. Network 100 can also include carousel server 107. A simple architecture is shown in FIG. 1 for illustrative brevity, although it will be recognized that comparable architectures with multiple origination points, servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts. In one or more embodiments of the invention, as discussed in greater detail below, server 104 is configured to implement functionality related to VOD catalog tailoring.

The VOD server 105 comprises a computer system where on-demand content can be received from one or more of the aforementioned data sources 102 and enter the network system. These servers may generate the content locally, or alternatively act as a gateway or intermediary from a distant source. In one or more non-limiting embodiments, all available VOD content is stored on VOD server 105 (or in separate persistent storage (not shown) readily accessible to VOD server 105).

The CPE 106 includes any equipment in the customer's or consumer's premises (or other appropriate locations) that can be accessed by a distribution server 104 and/or VOD server 105.

Figure 1A:
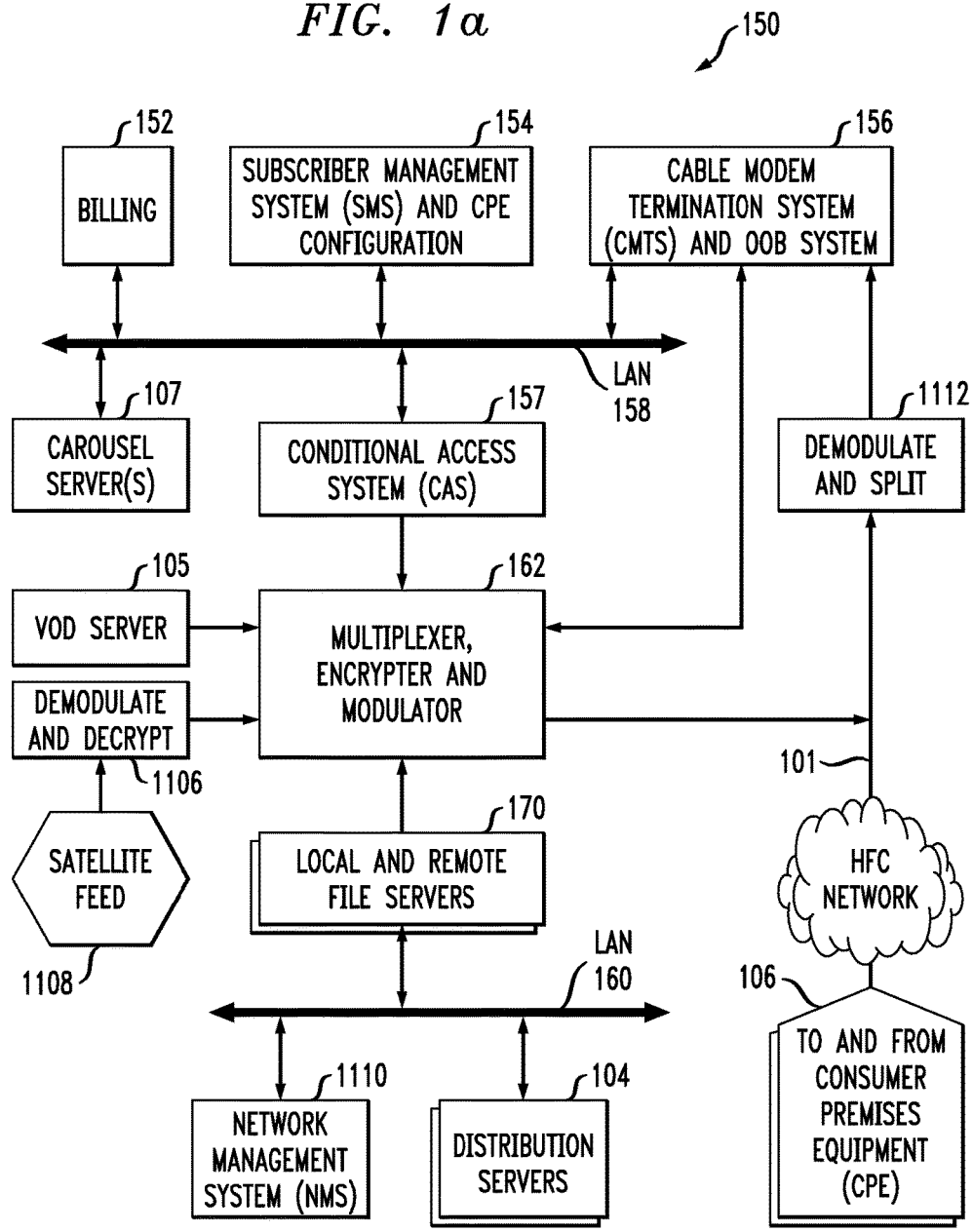
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and out-of-band (OOB) system 156, as well as local area networks (LAN(s)) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1a is a high-level, conceptual architecture and that each multi-service operator (MSO) may have multiple head-ends deployed using custom architectures. Furthermore, carousel server(s) 107 are shown on LAN 158, but could be located elsewhere in other embodiments; for example, on LAN 160 with server(s) 104. Note also that servers 104 are referred to interchangeably as application servers, distribution servers, or application distribution servers.

The architecture 150 of FIG. 1 a further includes a multiplexer/encrypter/modulator (MEM) 162 coupled to the HFC network 101 adapted to "condition" content for transmission over the network. The application distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1*b*) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specifications, OpenCable Host Device 2.1 (and subsequent) Core Functional Requirements, and TRU2WAY™ technology (marks of Cable Television laboratories Inc.) provide for exemplary networking protocols both downstream and upstream. Appropriate use can also be made of the Interactive Services Architecture (ISA) model, which was developed to provide VOD services (for example, the MYSTRO TV product) to Time Warner Cable systems, and is known to the skilled artisan from, for example, http://www.interactiveservices.org/. Of course, the invention is in no way limited to these approaches.

It will also be recognized that multiple servers (broadcast, VOD, application, carousel, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. Note, however, that in a preferred but non-limiting embodiment, one VOD server 105 has all the content, and unique catalogs are created for certain groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
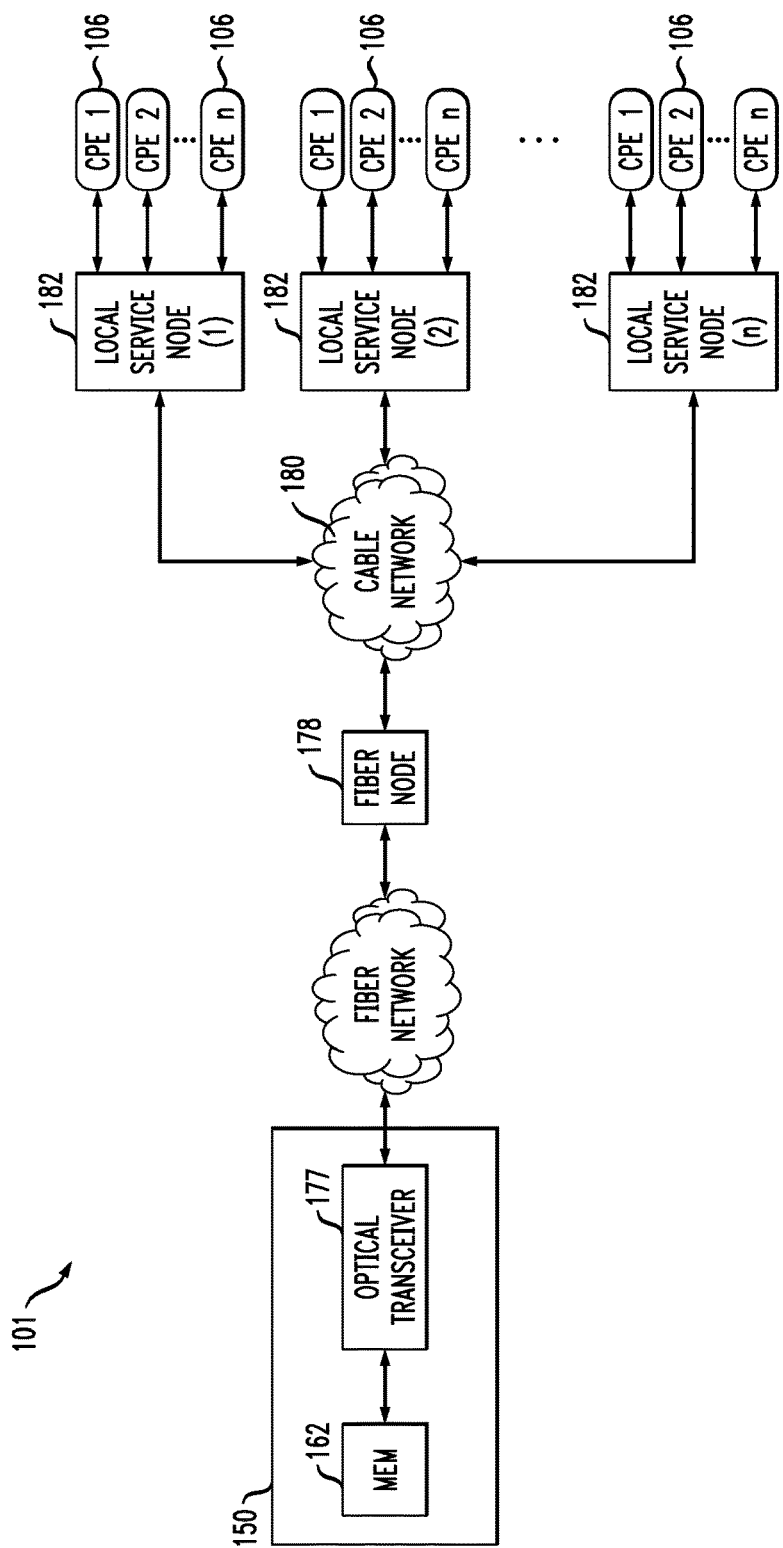
FIG. 1b is a functional block diagram illustrating one exemplary local service node configuration useful with the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the head-end or further downstream). The optical domain signals are then distributed to a fiber node 178, which further distributes the signals over a distribution network 180 to a plurality of local servicing nodes 182, each in turn interconnected with a number of CPEs 106. This provides an effective 1:N expansion of the network at the local service end.

In other embodiments of the invention, other network architectures can be employed. By way of example and not limitation, once such architecture is disclosed in US Patent Publication 2003-0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture. One or more embodiments of the invention are directed to VOD rather than broadcast; however, techniques of the invention could, in at least some cases, be offered at the same time as the broadcast technologies disclosed in the Brooks publication.

In operation, sources of content, which may include, for example, audio, video, and associated metadata, are received by head end 150 from content source 103. In the case of content that is available to be recorded for later viewing, such as via NDVR functionality, the audio and video may be stored on, or accessible to, VOD server 105, while the metadata may be employed to create one or more catalogs of stored content available for NDVR viewing. The catalog may reside, for example, on application server 104. In other embodiments, the catalog may be transmitted down to the CPE 106 (for example, a set-top box).

US Patent Publication 2005-0060745 of Riedl et al. discloses a system and method for advertisement delivery within a video time shifting architecture, including an NDVR control center. The complete disclosure of US Patent Publication 2005-0060745 of Riedl et al. is expressly incorporated herein by reference in its entirety for all purposes. It should be noted that in some embodiments, the components which store the content and/or catalogs could be located in an NDVR control center, which might be in a head end or external therefrom, but in communication with one or more head ends. The skilled artisan, given the teachings herein, will be able to implement such an approach.

Upon a request from CPE 106, a user can view the catalog on the television monitor in the premises, and make a selection from the catalog for viewing with the NDVR functionality.

In certain areas, such as major metropolitan areas, there may be a number of different advertisement ("ad") zones, customers with widely ranging demographics, and diverse subpopulations with different interests and cultures. In one or more embodiments of the invention, unique VOD catalogs are made available to certain areas or service groups (for example, different service nodes 182). In a preferred but non-limiting embodiment, one VOD server 105 has all the content, but unique catalogs are created for certain areas, which are offered content that has been selected for the particular area. Advantageously, in such an approach, it is not necessary to populate small subsets of content onto different VOD servers—instead, all content can be loaded on one VOD system (i.e., VOD server 105, functioning together with application server 104, billing module 152, and SMS 154) instead of setting up a number of different, separate, and unique VOD systems.

In at least some cases, aspects of the invention are believed to be particularly applicable to localized sporting events, free on-demand local content, and the like. Previously, segmenting of VOD catalogs by area has not been implemented; application server 104 would, in current systems, typically have a single catalog, the same for all subscribers. In one or more embodiments of the invention, an operator for a given area, such as a cable MSO and/or a local affiliate, is afforded the ability to select what can be viewed; for example, by geographic area (but note that this it but one parameter on which the catalogs may be segmented), service group (for example, down to the level of HFC node 182), demographic, ad zone, and the like. The skilled artisan will be familiar with the concept of local advertising ("ad") zones from, for example, the aforementioned US Patent Publication 2005-0060745 of Riedl et al. Note that, by way of example and not limitation, the cable MSO might make catalog selections if there was a desire to tailor a national VOD catalog, while a local affiliate might make catalog selections for tailoring local content.

The operator for the given area may be presented, for example, with a user interface for making selections, or the catalog segmentation may be carried out via automatic or semi-automatic techniques; for example, by software residing on application server 104. An automatic technique might be based, for example, on tagging in the metadata, which might automatically be affiliated to a certain location. In manual or semi-automatic techniques, there may be knowledge as to where (in terms, for example, of locality) content should be targeted, which may not be reflected in the metadata. Data that may be used for segmenting the catalog include, but are not limited to, the internet protocol (IP) address or other Layer 2 address of the client (CPE 106); the media access control (MAC) or other Layer 3 address of the client (CPE 106); the identifier of the client's PRIZM cluster (the PRIZM market segmentation system from Claritas, Inc. is known to those skilled in the art); ZIP or ZIP+4 code (or other postal code in other countries); viewing history including current program being viewed, channel, time, past viewing habits; and the like. Segmenting based on service groups (e.g., nodes) is discussed elsewhere herein.

It should be noted that in some cases, the segmentation of the catalog can be carried out at the CPE 106 (for example, a set-top box (STB)); segmentation at the head end (for example, application server 104) is also possible. If the latter case, only the catalog data for on-demand assets available at the particular STB (based on area or one or more of the other criteria discussed above) will be delivered to the particular STB. On the other hand, if segmentation of the catalog is handled in the STB, the STB would have all catalog data but would filter it, again, based on area (location of the STB) or one or more of the other criteria discussed above. Code for segmenting the catalog can be downloaded to the local STB from server 104 using a number of known techniques; for example, out-of-band or in-band.

In certain current systems, VOD catalogs are available to subscribers based on which carousel server 107 they are connected to. Thus, the lowest level of subscriber granularity for catalog availability is at the regional level. One or more embodiments of the invention provide techniques to make catalogs available by demographic, particular service group, and the like. At least some instances of the invention will be facilitated by the gravitation of MSOs to more finely addressable networks. In one or more embodiments, different categories of subscribers within a region can be offered different VOD catalogs and content options. Areas with known demographics can be identified.

For example, there may be one or more particular populations known to speak a native language other than English; members of such populations could be offered VOD catalogs that feature content in their native tongue. Material of interest to such ethnic enclaves may not be applicable in other locations. In another non-limiting example, service groups, such as those with subscriptions for many premium services (movies and the like) can be offered more current releases on a particular VOD catalog, because they will be more likely to spend additional money on such content. These subscribers can be identified through the billing system 152 or through a query of the set top box permissions in a two way environment. Permissions may be obtained, for example, by application server 104 from billing system 152. Typically, entitlements and so on are handled in the head end 150 (for example, by CAS 157 in conjunction with billing module 152 and SMS 154). Optionally, the application server 104 manages associating entitlements to the segmented catalog (for example, in a case of subscription VOD where a certain entitlement may be tied to what content is available, in order to avoid presenting a catalog with information that the subscriber does not have permission to view (also applicable to parental controls)). In at least some instances, server 104 communicates with subscriber management system 154 and determines which subscriber has subscribed to what content.

Aspects of the invention thus enable a regionalized VOD service, allowing for different catalogs to be available based on subscriber groups, demographics, and so on.

Thus, in one or more embodiments of the invention, multiple catalogs are constructed on application server 104, by an operator. The catalogs are based on demographics, geographic location, and/or other factors discussed above. VOD server 105 has all the available VOD content stored on it, or directly accessible to it in a suitable asset storage. Subscribers only see a view of the VOD content on VOD server 105 that is filtered by application server 104 based upon demographics, geographic location, and/or other factors discussed above. In some embodiments, the operator will manually edit the list of content in a menu system, to create the multiple catalogs. For example, a catalog application residing on server 104 may be configured with a graphical user interface (GUI) to facilitate editing of the catalogs by the operator.

Note that carousel server 107 may reside in the head end and essentially function as an extension of server 104. Servers 104 and 107 can be interconnected. Carousel server 107 may be located, for example, between application server 104 and HFC network 101. Note that VOD server 105 is shown interconnected with network 101 and application server 104 is shown as interconnected with network 101 through carousel server 107; however, the servers may reside on LANs with other components intermediate the servers and network 101, as seen in FIG. 1a.

Thus, in certain current techniques, application server 104 has all the VOD catalog information and it publishes all of same to the full HFC network 101 that it services. In particular, application server 104 publishes the VOD catalog information to the carousel 107. STB 106 can then pick the data up off of carousel 107. In such current approaches, every CPE 106 sees the same catalog from application server 104 by way of carousel server 107. In one or more embodiments of the invention, different CPEs 106 see different views of the VOD catalog, based on geographic location, information pertaining to what other channels, services, and the like they subscribe to, and so on (a number of different bases for segmentation of the VOD catalog have been discussed above).

With reference to FIG. 2, and given the preceding discussion, it will be appreciated that, in general terms, an exemplary method 200, after beginning at step 202, includes the step 204 of storing a plurality of audiovisual assets in association with a video on demand server (i.e., stored on the VOD server or in asset storage accessible to the VOD server). The audiovisual assets may include movies, archived programs, pre-recorded sporting events, and so on, which subscribers choose to view (as opposed to advertisements which subscribers may watch incidental to requested programming). Optional step 206, to be discussed further below, includes segmenting the second group of subscribers from the first group of subscribers. Step 208 includes preparing a first video-on-demand catalog including a first group of the audiovisual assets, while step 210 includes preparing a second video-on-demand catalog including a second group of the audiovisual assets. The second group of audiovisual assets is different than the first group of the audiovisual assets. For example, the plurality of audiovisual assets might include assets A, B, C, D, E, F and G. The first group of audiovisual assets might include, for example, assets A, C, D, and F; while the second group of audiovisual assets might include, for example, assets B, C, F, and G. Step 212 includes making the first video-on-demand catalog available to a first group of subscribers, and step 214 includes making the second video-on-demand catalog available to a second group of subscribers, different than the first group of subscribers. The first and second groups of subscribers may then watch one or more selections selected from their respective catalogs. Processing continues in block 216. Of course, any number of groups can be provided with catalogs.

The separate VOD catalogs created in step 210 or in step 208 might include, for example, a local sporting event of greater interest to one group of subscribers as compared to the other group of subscribers, and/or local on-demand content of greater interest to one group of subscribers as compared to the other group of subscribers.

Step 206 can be carried out in a variety of ways. For example, in some cases, segmenting includes segmenting the second group of subscribers from the first group of subscribers based on at least a geographic area (for example, service group such as network node) of the second group of subscribers. In another approach, segmenting includes segmenting the second group of subscribers from the first group of subscribers based on at least demographic aspects of the second group of subscribers as compared to demographic aspects of the first group of subscribers. Non-limiting examples of demographic aspects include primary language, zip or zip plus four, PRIZM data, interests, cultural background, membership in a sub-population, and the like.

In some instances, the first group of subscribers are in a first service group and the second group of subscribers are in a second service group different than the first service group. In such a case, segmenting step 206 can include segmenting the second group of subscribers from the first group of subscribers based on at least the first and second service groups. The service groups may correspond to hybrid fiber cable nodes 182 (or similar network nodes in other types of networks) and the segmenting step 206 can include segmenting the second group of subscribers from the first group of subscribers based on at least the first and second hybrid fiber cable nodes.

In some embodiments, segmenting step 206 includes segmenting the second group of subscribers from the first group of subscribers based on at least viewing habits of the second group of subscribers (for example, data regarding programs previously viewed; data regarding subscriptions to certain services, such as premium movie channels, and the like). In some instances, segmenting step 206 includes segmenting the second group of subscribers from the first group of subscribers based on at least addresses of consumer premises equipment of the second group of subscribers as compared to addresses of consumer premises equipment of the first group of subscribers. Examples of addresses include the IP address or other Layer 2 address of the client (CPE 106), the MAC or other Layer 3 address of the client (CPE 106), and so on.

Another non-limiting example of segmenting includes a case where the first group of subscribers are in a first local advertising zone and the second group of subscribers are in a second local advertising zone different than the first local advertising zone, where segmenting step 206 can include, for example, segmenting the second group of subscribers from the first group of subscribers based on at least the first and second local advertising zones.

It will also be appreciated that, in general terms, a video content system includes a video-on-demand server 105 having a plurality of audiovisual assets stored in association therewith. Also included is an application server module (for example, application server 104 coupled to carousel server 107, or an application server 104 configured to handle the functionality, as described herein, of both components 104 and 107). The video-on-demand server module and the application sever module can be co-located in a head end 150 of the video content system, in an NDVR control center, and so on.

Also included are a first group of CPEs 106 associated with a first group of subscribers and a second group of CPEs 106 associated with a second group of subscribers, different than the first group of subscribers. A video content network, such as HFC network 101, interconnects the video-on-demand server and the application server module to the first and second groups of consumer premises equipment. The application server module, the first group of consumer premises equipment, and the second group of consumer premises equipment can be cooperatively configured to carry out one or more of the steps described with respect to FIG. 2. "Cooperatively configured" is intended to include a case where such steps are carried out by any one or more of: (i) the application server module, (ii) the first group of consumer premises equipment, and (iii) the second group of consumer premises equipment.

In some cases, the aforementioned segmenting is carried out by the application server module, which is configured to segment the second group of subscribers from the first group of subscribers.

In one or more embodiments, a user interface module is included, and is associated with the application server module. The user interface module is configured to facilitate an operator of the video content system to perform the segmenting. In a non-limiting example, the user interface module is a software module running on application server 104, and server 104 includes a display and one or more suitable input devices (mouse, keyboard, and the like) as discussed below with regard to exemplary system 400 of FIG. 4. An example user interface is discussed below with respect to FIG. 3.

In one or more instances, the video content system includes a first hybrid fiber cable node 182 (or similar network node in another type of network) associated with the first group of consumer premises equipment and a second hybrid fiber cable node 182 (or similar network node in another type of network) associated with the second group of consumer premises equipment. The application server module can be configured to segment the second group of subscribers from the first group of subscribers based on the first and second hybrid fiber cable nodes.

Note that segmenting based on layer 2 or 3 addresses of the CPE may be carried out, for example, when the application server 104 does the segmenting. Such segmenting based on layer 2 or 3 addresses of the CPE may, in at least some embodiments, be less applicable when the CPE 106 does the segmenting.

In one or more embodiments, the first group of consumer premises equipment and the second group of consumer premises equipment are cooperatively configured to segment the second group of subscribers from the first group of subscribers. This may be based, for example, on at least addresses of the first group of consumer premises equipment as compared to addresses of the second group of consumer premises equipment.

Note that a GUI on the application server 104 can be employed when the operator performs the segmenting; it may even be useful in some cases when the when the CPE 106 performs the segmenting. As a non-limiting example of the latter case, a default could be set up for a population of set-top boxes, using the GUI, by creating a configuration message.

Figures 3, 4:
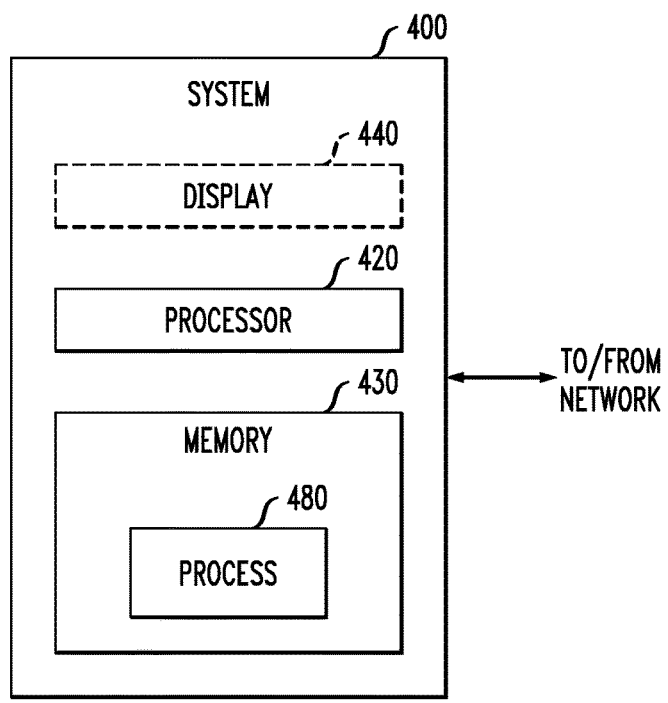
FIG. 3 shows an exemplary graphical user interface, according to another aspect of the invention.
FIG. 4 is a block diagram of a computer system useful in connection with one or more aspects of the invention.

FIG. 3 depicts a non-limiting example of a GUI which can be provided on the application server module, to allow editing of the separate VOD catalogs by the system operator. A first column 302 can be provided to list assets available on VOD server 105. Non-limiting examples of assets include a first movie 308 in English, a first classic hockey game 310, a second movie 312 in Russian, a third movie 314 in English, and a first classic baseball game 316. A second column 304 can be provided to specify which assets from column 302 are to be listed in the catalog for a first group. A third column 306 can be provided to specify which assets from column 302 are to be listed in the catalog for a second group. Of course, more columns can be provided for more groups. In the non-limiting example of FIG. 3, all assets except the Russian-language movie 312 are listed in the catalog for Group 1, while only the hockey game 310 and Russian-language movie 312 are listed in the catalog for Group 2. The operator may, for example, click or type an "X" in the corresponding row in a given column 304, 306 to select whether a given asset from column 302 is to be included in that catalog.

It should be noted that, while an example has been given herein in the context of an HFC video content network, one or more of the following types of content network are exemplary of those that can be used with one or more embodiments of the invention:

a cable television network (or other content network, for example, a telecommunications company video delivery network such as fiber to the home (FTTH), fiber to the curb (FTTC), or digital subscriber line (DSL)), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA).

It should also be noted that, in one or more embodiments, the VOD catalog can be sent to the CPE in-band, out-of-band, or via DOCSIS.

System and Article of Manufacture Details

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps.

FIG. 4 is a block diagram of a system 400 that can implement part or all of one or more aspects or processes of the present invention, processor 420 of which is representative of processors (such as those in elements or blocks 102, 104, 105, 106, 107, 150 (and sub-elements thereof), and elsewhere) depicted in the other figures. In one or more embodiments, inventive steps are carried out by one or more of the processors in conjunction with one or more interconnecting network(s). As shown in FIG. 4, memory 430 configures the processor 420 to implement one or more aspects of the methods, steps, and functions disclosed herein (collectively, shown as process 480 in FIG. 4). The memory 430 could be distributed or local and the processor 420 could be distributed or singular. The memory 430 could be implemented as an electrical, magnetic or optical memory, or any combination of these or other types of storage devices. It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an application specific integrated circuit (ASIC) rather than using firmware. Display 440 is representative of a variety of possible input/output devices, also including mice, keyboards, and the like.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, electronically erasable programmable read-only memories (EEPROMs), or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. More-over, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein. Non-limiting examples of computer languages that may be used to implement such instructions include C, C+, C++, JAVA, VISUAL BASIC, ASSEMBLER, and various other low-level or high-level languages such as, by way of example and not limitation, structured languages, object-oriented languages, and the like.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of: storing, by a video on demand server in a head end, a catalog comprising a plurality of audiovisual assets; filtering, by an application server in said head end, a view of said plurality of audiovisual assets in preparing a first video-on-demand catalog facilitating a selection of one or more audiovisual assets from a first group of said audiovisual assets residing on said video on demand server; associating, by said application server in said head end, said first video-on-demand catalog with a first entitlement of said first group to view assets from said first group of said audiovisual assets; filtering, by said application server in said head end, said view of said plurality of audiovisual assets in preparing a second video-on-demand catalog facilitating a selection of one or more audiovisual assets from a second group of said audiovisual assets residing on said video on demand server, said second group of said audiovisual assets being different than said first group of said audiovisual assets; associating, by said application server in said head end, said second video-on-demand catalog with a second entitlement of said second group to view assets from said second group of said audiovisual assets; sending said first video-on-demand catalog to a first group of subscribers having said first entitlement; and sending said second video-on-demand catalog to a second group of subscribers, different than said first group of subscribers, and having said second entitlement, wherein said first video-on-demand catalog is not sent to said second group of subscribers.

2. The method of claim 1, further comprising the additional step of segmenting said second group of subscribers from said first group of subscribers based on at least geographic area of said second group of subscribers.

3. The method of claim 1, further comprising the additional step of segmenting said second group of subscribers from said first group of subscribers based on at least demographic aspects of said second group of subscribers as compared to demographic aspects of said first group of subscribers.

4. The method of claim 1, wherein said first group of subscribers are in a first service group and said second group of subscribers are in a second service group different than said first service group, further comprising the additional step of segmenting said second group of subscribers from said first group of subscribers based on at least said first and second service groups.

5. The method of claim 4, wherein said first service group corresponds to a first network node and said second service group corresponds to a second network node, and wherein said segmenting step comprises segmenting said second group of subscribers from said first group of subscribers based on at least said first and second network nodes.

6. The method of claim 1, further comprising the additional step of segmenting said second group of subscribers from said first group of subscribers based on at least viewing habits of said second group of subscribers.

7. The method of claim 1, further comprising the additional step of segmenting said second group of subscribers from said first group of subscribers based on at least addresses of consumer premises equipment of said second group of subscribers as compared to addresses of consumer premises equipment of said first group of subscribers.

8. The method of claim 1, wherein said first group of subscribers are in a first local advertising zone and said second group of subscribers are in a second local advertising zone different than said first local advertising zone, further comprising the additional step of segmenting said second group of subscribers from said first group of subscribers based on at least said first and second local advertising zones.

9. The method of claim 1, wherein, in said step of preparing said second video-on-demand catalog, said second group of subscribers is associated with said second entitlement to view at least one of said second group of audiovisual assets, wherein said second entitlement is not associated with said first group of subscribers.

10. The method of claim 1, wherein, in said step of preparing said second video-on-demand catalog, said second group of audiovisual assets comprises content of greater interest to said second group of subscribers than said first group of subscribers.

11. A video content system comprising:
a video-on-demand server having a plurality of audiovisual assets stored in association therewith;
an application server module;
a first group of consumer premises equipment associated with a first group of subscribers;
a second group of consumer premises equipment associated with a second group of subscribers, different than said first group of subscribers; and
a video content network interconnecting said video-on-demand server and said application server module to said first and second groups of consumer premises equipment;
wherein said application server module is configured to:
filter a view of said plurality of audiovisual assets and prepare a first video-on-demand catalog facilitating a selection of one or more audiovisual assets from a first group of said audiovisual assets residing on said video on demand server;

associate said first video-on-demand catalog with a first entitlement of said first group to view assets from said first group of said audiovisual assets;

filter said view of said plurality of audiovisual assets and prepare a second video-on-demand catalog facilitating a selection of one or more audiovisual assets from a second group of said audiovisual assets residing on said video on demand server, said second group of said audiovisual assets being different than said first group of said audiovisual assets;

associate said second video-on-demand catalog with a second entitlement of said second group to view assets from said second group of said audiovisual assets;

send said first video-on-demand catalog to said first group of consumer premises equipment associated with said first group of subscribers having said first entitlement; and send said second video-on-demand catalog to said second group of consumer premises equipment associated with said second group of subscribers having said second entitlement, wherein said first video-on-demand catalog is not sent to said second group of subscribers.

12. The video content system of claim 11, wherein said application server module comprises an application server and a carousel server coupled to said application server.

13. The video content system of claim 12, wherein said video-on-demand server and said application sever module are co-located in a head end of said video content system.

14. The video content system of claim 13, wherein said application server module is configured to facilitate segmenting said second group of subscribers from said first group of subscribers.

15. The video content system of claim 14, further comprising a user interface module associated with said application server module, said user interface module being configured to facilitate an operator of said video content system to perform said segmenting.

16. The video content system of claim 14, further comprising:
a first network node associated with said first group of consumer premises equipment; and
a second network node associated with said second group of consumer premises equipment;
wherein said application server module is configured to segment said second group of subscribers from said first group of subscribers based on said first and second network nodes.

17. The video content system of claim 14, wherein said application server module is configured to segment said second group of subscribers from said first group of subscribers based on at least addresses of said first group of consumer premises equipment as compared to addresses of said second group of consumer premises equipment.

18. The video content system of claim 13, wherein said first group of consumer premises equipment and said second group of consumer premises equipment are cooperatively configured to facilitate segmenting said second group of subscribers from said first group of subscribers.

19. The video content system of claim 18, further comprising a user interface module associated with said application server module, said user interface module being configured to facilitate an operator of said video content system to create at least a default configuration message for said first group of consumer premises equipment and said second group of consumer premises equipment.

20. The video content system of claim 13, wherein said second group of audiovisual assets comprises a local sporting event of greater interest to said second group of subscribers than said first group of subscribers.

21. The video content system of claim 13, wherein said second group of audiovisual assets comprises local on-demand content of greater interest to said second group of subscribers than said first group of subscribers.

22. An apparatus comprising:
means for storing a plurality of audiovisual assets in association with a video on demand server;
means for filtering a view of said plurality of audiovisual assets in preparing a first video-on-demand catalog facilitating a selection of one or more audiovisual assets from first group of said audiovisual assets residing on said video on demand server and preparing a second video-on-demand catalog facilitating a selection of one or more audiovisual assets from a second group of said audiovisual assets residing on said video on demand server, said second group of said audiovisual assets being different than said first group of said audiovisual assets;
means for associating said first video-on-demand catalog with a first entitlement of said first group to view assets from said first group of said audiovisual assets and associating said second video-on-demand catalog with a second entitlement of said second group to view assets from said second group of said audiovisual assets; and
means for sending said first video-on-demand catalog to a first group of subscriber having said first entitlement and sending said second video-on-demand catalog to a second group of subscribers having said second entitlement, wherein said first video-on-demand catalog is not sent to said second group of subscribers,
wherein said second group of subscribers is different than said first group of subscribers, and
wherein said means for storing a plurality of audiovisual assets is co-located with means for filtering said plurality of audiovisual assets.

23. The apparatus of claim 22, further comprising means for facilitating segmenting said second group of subscribers from said first group of subscribers.

24. An apparatus comprising:
a memory; and
at least one processor, coupled to said memory, and operative to:
store a plurality of audiovisual assets in association with a video on demand server;
prepare a first video-on-demand catalog facilitating a selection of one or more audiovisual assets from a first group of said audiovisual assets residing on said video on demand server;
associate said first video-on-demand catalog with a first entitlement of said first group to view assets from said first group of said audiovisual assets;
prepare a second video-on-demand catalog facilitating a selection of one or more audiovisual assets from a second group of said audiovisual assets residing on said video on demand server, said second group of said audiovisual assets being different than said first group of said audiovisual assets;
associate said second video-on-demand catalog with a second entitlement of said second group to view assets from said second group of said audiovisual assets;

send said first video-on-demand catalog to a first group of subscribers having said first entitlement; and send said second video-on-demand catalog to a second group of subscribers, different than said first group of subscribers, and having said second entitlement, wherein said first video-on-demand catalog is not sent to said second group of subscribers.

25. The apparatus of claim 24, wherein said at least one processor is further operative to facilitate segmenting said second group of subscribers from said first group of subscribers.

\* \* \* \* \*